(12) United States Patent
Chen et al.

(10) Patent No.: US 6,816,348 B2
(45) Date of Patent: Nov. 9, 2004

(54) INPUT PROTECTION CIRCUIT OF A HANDHELD ELECTRIC DEVICE

(75) Inventors: Chung-Ho Chen, Taipei (TW); Chien-Hao Huang, Taipei Hsien (TW); Gin-Yuan Sheh, Taipei Hsien (TW)

(73) Assignee: Compal Electronics, Inc., Taipei (TW)

( * ) Notice: Subject to any disclaimer, the term of this patent is extended or adjusted under 35 U.S.C. 154(b) by 249 days.

(21) Appl. No.: 09/683,651

(22) Filed: Jan. 29, 2002

(65) Prior Publication Data

US 2002/0171298 A1 Nov. 21, 2002

(30) Foreign Application Priority Data

May 18, 2001 (TW) ........................................ 90112006 A

(51) Int. Cl.$^7$ ............................................. H02H 3/20
(52) U.S. Cl. ........................................ 361/56; 361/91.1
(58) Field of Search ........................... 361/56, 86, 91.1, 361/111; 307/127

(56) References Cited

U.S. PATENT DOCUMENTS

| | | | | |
|---|---|---|---|---|
| 4,495,536 A | * | 1/1985 | Bynum | ........................ 361/58 |
| 4,562,454 A | * | 12/1985 | Schultz et al. | .............. 257/529 |
| 5,500,619 A | * | 3/1996 | Miyasaka | ................... 327/427 |
| 5,541,500 A | * | 7/1996 | Krahl | ......................... 323/299 |
| 5,621,601 A | * | 4/1997 | Fujihira et al. | ............ 361/93.9 |
| 6,538,866 B1 | * | 3/2003 | Hanzawa et al. | .......... 361/91.1 |

* cited by examiner

Primary Examiner—Brian Sircus
Assistant Examiner—Danny Nguyen
(74) Attorney, Agent, or Firm—Winston Hsu

(57) ABSTRACT

An input protection circuit is provided for protecting internal circuitry of a handheld electric device. The internal circuitry has a positive input node and a ground node. The input protection circuit includes a power socket having a positive input node and a ground node, a bipolar junction transistor (BJT), a metal-oxide semiconductor (MOS) transistor for controlling the on and off states of the BJT, and an overvoltage protective circuit. An emitter of the BJT is electrically connected to the positive input node of the power socket, and a collector is electrically connected to the positive input node of the internal circuitry. When a reverse DC voltage or a DC voltage exceeding a threshold inputs from the power socket, the overvoltage protective circuit will turn off the MOS transistor, thereby turning off the BJT to prevent damages of the internal circuitry.

4 Claims, 3 Drawing Sheets

INPUT PROTECTION CIRCUIT OF A HANDHELD ELECTRIC DEVICE

BACKGROUND OF INVENTION

1. Field of the Invention

The present invention relates to an input protection circuit for protecting internal circuitry of a handheld electric device. More specifically, the present invention discloses an input protection circuit with low power consumption.

2. Description of the Prior Art

In modern society, people hope to receive all kinds of information via handheld electric devices, such as a personal digital assistant (PDA), a mobile phone, etc. These handheld electric devices have complex internal circuitry for dealing with great amount of data. The internal circuitry must have a certain threshold voltage to provide a direct current (DC) bias voltage for operating regularly. When a DC voltage exceeds the threshold voltage or a reverse DC voltage inputs to the internal circuitry, the internal circuitry will be damaged and the handheld electric device will have abnormal operation.

For preventing improper damages of the internal circuitry, the handheld electric device has an input protection circuit for protecting the internal circuitry. Please refer to FIG. 1 of a diagram of an input protection circuit 12 applied in a handheld electric device 10 according to the prior art. The handheld electric device 10 has a direct current (DC) power supply 24 for providing DC power. The DC power supply 24 inputs the DC power to an internal circuitry 14 through the input protection circuit 12 of the handheld electric device 10 for protecting the internal circuitry 14 of the handheld electric device 10. The input protection circuit 12, electrically connected between the DC power supply 24 and the internal circuitry 14, has a power socket 16. The power socket 16 comprises a positive input node 16A and a ground node 16B, respectively electrically connected to two output nodes 24A and 24B of the DC power supply 24 for inputting the DC power provided from the DC power supply 24 to the input protection circuit 12. The input protection circuit 12 further comprises two power connection channels 21 and 23, respectively electrically connected to the positive input node 16A and the ground node 16B of the power socket 16 and the positive input node 14A and the ground node 14B of the internal circuitry 14 for forming electric connection between the DC power supply 24 and the internal circuitry 14.

The prior art input protection circuit 12 further comprises a power diode D1 and a pnp-type bipolar junction transistor (BJT) Q1 respectively connected to the power connection channel 21 for controlling the DC power inputting through the power connection channel 21 to the internal circuitry 14 so as to protect the internal circuitry 14. A base of the pnp-type BJT Q1 electrically connects to an npn-type BJT Q2 functioning as a control transistor, and a base of the npn-type BJT Q2 electrically connects to an output node 20A of an overvoltage protective circuit 20. The overvoltage protective circuit 20 further comprises two input nodes 20B and 20C respectively connected to two power connection channels 21 and 23.

An operation principle of the prior art input protection circuit 12 can be described as follows. A BJT can utilize a base current to turn the current between a collector and an emitter on and off. When a DC voltage provided by the DC power supply 24 is below a threshold voltage of the internal circuitry 14, the power diode D1, the transistor Q1, and the control transistor Q2 are all turned on so that the current provided by the DC power supply 24 flows into the internal circuitry 14 through the power connection channel 21. When a DC voltage provided by the DC power supply 24 exceeds the threshold voltage of the internal circuitry 14, the overvoltage protective circuit 20 with the two input nodes 20B and 20C electrically connecting between the power connection channel 21 and 23 will detect a overvoltage between the positive node 16A and the ground node 16B. Then, the overvoltage protective circuit 20 draws the base current out of the control transistor Q2 through the output node 20A so as to reduce the on current flux between the collector and the emitter of the control transistor Q2, and even turning off the control transistor Q2. Current reduction or elimination between the collector and the emitter of the control transistor Q2 causes the base current of the transistor Q1 to be reduced or turned off thereby causing the current between the emitter and the collector of the transistor Q1 to be reduced or turned off. This prevents the DC current caused by exceeding the threshold voltage from flowing from the DC power supply 24 into the internal circuitry 14 through the transistor Q1.

If the output node 24A of the DC power supply 24 which will connect with the positive input node 16A is connected to the ground node 16B, and if the output node 24B of the DC power supply 24 which will connect with the ground node 16B is connected to the ground node 16A, the power diode D1 positioned at the power connection channel 21 will be turned off so as to protect the internal circuitry 14.

A defect of the prior art input protection circuit 12 is the utilization of the BJT to control the transistor Q2. When the voltage of the DC power supply 24 is below the threshold voltage, the control transistor Q2 stays on so as to turn on the transistor Q1. Thus, the DC power of the DC power supply 24 is electrically connected to the internal circuitry 14. The overvoltage protective circuit 20 outputs a current from the output node 20A to the base of the control transistor Q2 because the BJT must use the base current to control the transistor Q2. As a result, the overvoltage protective circuit 20 must consume power to maintain normal operation. Volume of the prior art overvoltage protective circuit 20 cannot be lessened because the overvoltage protective circuit 20 consumes power for preventing the prior art input protection circuitry 12 from overheating. Furthermore, the power diode D1 positioned at the power connection channel 21 must admit the DC power to pass from the DC power supply 24 to the internal circuitry 14, meaning that the power diode D1 must be a diode with a large volume and the ability to bear high DC power. The above-mentioned reasons increase power consumption of the prior art input protection circuit 12 and do not allow the whole volume of the input protection circuit 12 to be lowered.

SUMMARY OF INVENTION

It is therefore a primary objective of the claimed invention to provide an input protection circuit with low power consumption to effectively lessen a volume of the input protection circuit.

The claimed invention discloses an input protection circuit for protecting internal circuitry of a handheld electric device. The internal circuitry has a positive input node and a ground node. The input protection circuit comprises a power socket having a positive input node and a ground node, a bipolar junction transistor (BJT), a metal-oxide semiconductor (MOS) transistor for controlling the on and off states of the BJT, and an overvoltage protective circuit. The power socket is used to electrically connect with two output nodes of a direct current (DC) power supply whose ground node is electrically connected to the ground node of the internal circuitry. An emitter of the BJT is electrically connected to the positive input node of the power socket, and a collector is electrically connected to the positive input node of the internal circuitry. When a reverse DC voltage or a DC voltage exceeding a threshold inputs from the positive input node and the ground node of the power socket, the overvoltage protective circuit will turn off the MOS transistor thereby turning off the BJT to prevent damages of the internal circuitry. When a DC voltage below the threshold inputs from the positive input node and the ground node of the power socket, the overvoltage protective circuit will turn on the MOS transistor thereby turning on the BJT so as to input the DC voltage to the internal circuitry through the BJT.

It is an advantage of the claimed invention that the handheld electric device has an input protection circuit having a lessened volume to effectively prevent a DC voltage from exceeding the threshold voltage and a reverse voltage from damaging the internal circuitry of the handheld electric device.

These and other objectives and advantages of the present invention will no doubt become obvious to those of ordinary skill in the art after reading the following detailed description of the preferred embodiment that is illustrated in the various figures and drawings.

DETAILED DESCRIPTION

Figure 1:
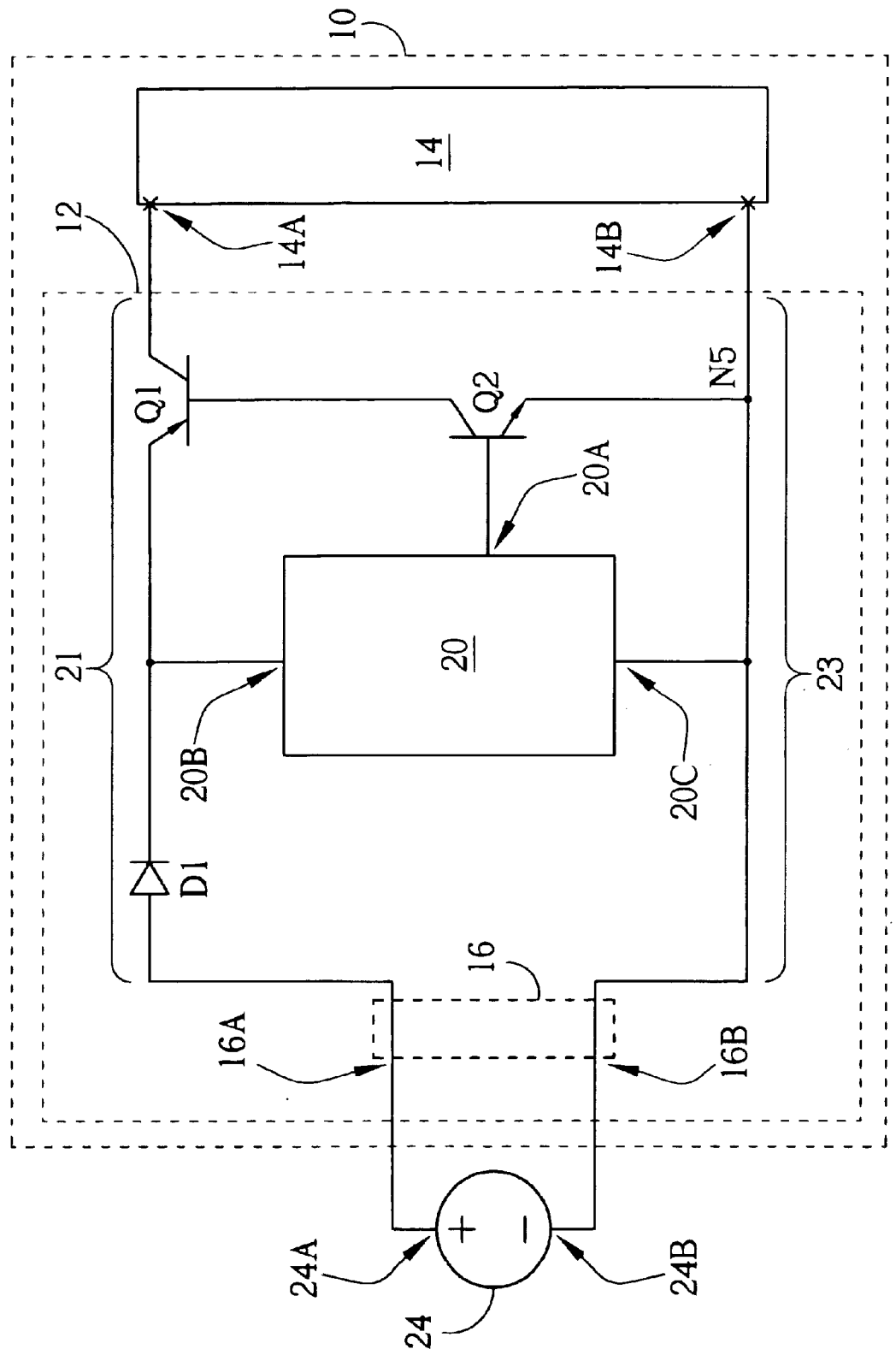
FIG. 1 is a functional block diagram of an input protection circuit applied in a handheld electric device according to the prior art.
Figure 2:
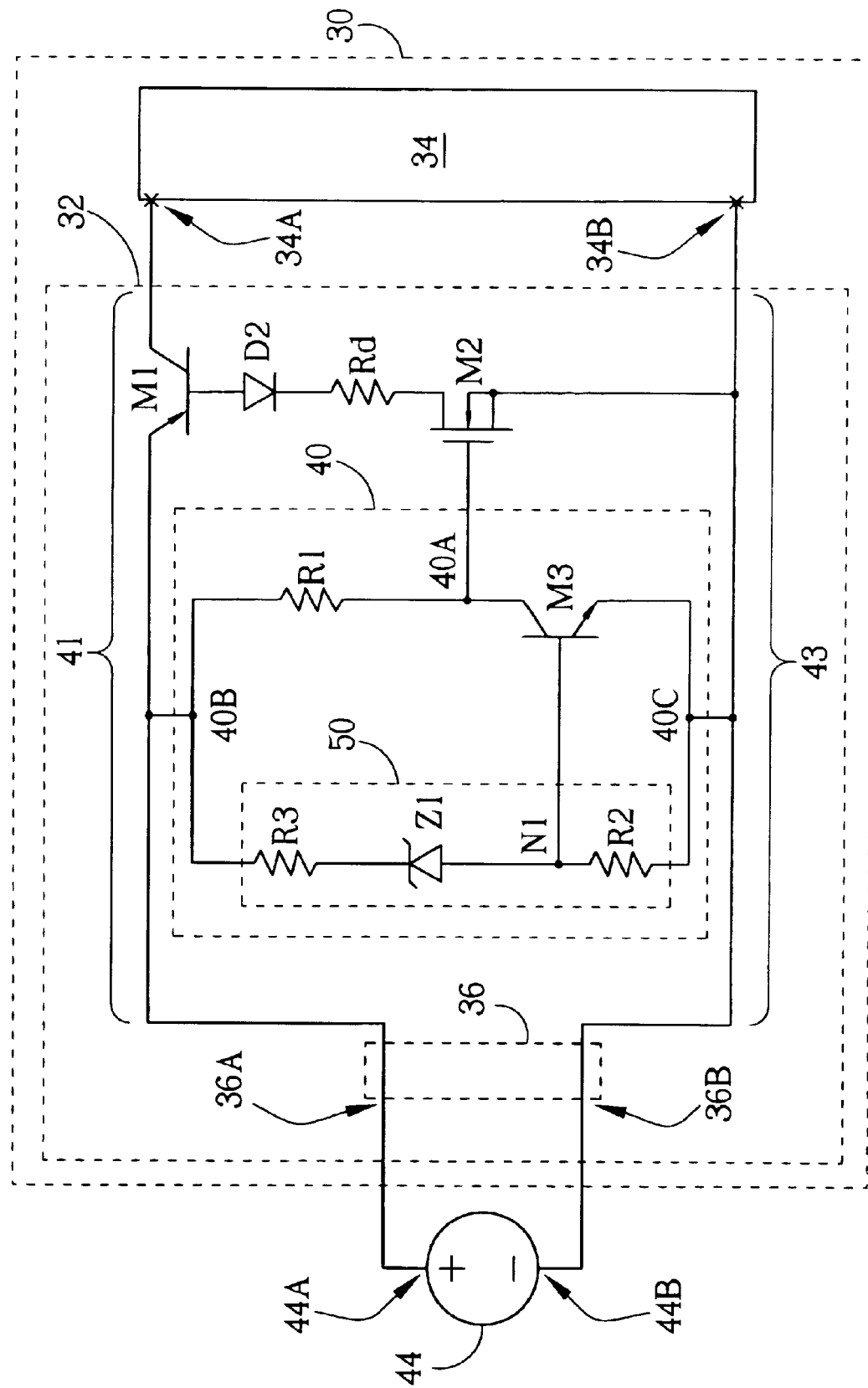
FIG. 2 is a functional block diagram of an input protection circuit applied in a handheld electric device according to the present invention.

Please refer to FIG. 2. FIG. 2 is a functional block diagram of an input protection circuit 32 applied in a handheld electric device 30 for protecting internal circuitry 34 according to the present invention. The handheld electric device 30 has a direct current (DC) power supply 44 for providing DC power. The input protection circuit 32 electrically connected between the DC power supply 44 and the internal circuitry 34 has a power socket 36. The power socket 36 comprises a positive input node 36A and a ground node 36B, respectively electrically connected to two output nodes 44A and 44B of the DC power supply 44 for inputting the DC power provided from the DC power supply 44 to the input protection circuit 32. The input protection circuit 32 further comprises two power connection channels 41 and 43, respectively electrically connected to the positive input node 36A and the ground node 36B of the power socket 36, and the positive input node 34A and the ground node 34B of the internal circuitry 34 for forming an electric connection between the DC power supply 44 and the internal circuitry 34.

The present invention input protection circuit 32 comprises a pnp-type bipolar junction transistor (BJT) M1, a diode D2, a metal-oxide semiconductor (MOS) transistor M2, a high-resistance resistor Rd, and an overvoltage protective circuit 40. An emitter and a collector of the pnp-type BJT M1 are positioned at the power connection channel 41 in a series connection manner and, respectively electrically connected to the positive input node 36A of the power socket 36 and the positive input node 34A of the internal circuitry 34. The diode D2 is electrically connected between the pnp-type BJT M1 and the high-resistance resistor Rd. The MOS transistor M2 has a source electrically connected to the ground node 36B of the power socket 36, a drain electrically connected to the high-resistance resistor Rd, and a gate electrically connected to an output node 40A of the overvoltage protective circuit 40. A substrate of the MOS transistor M2 is electrically connected with the source of the MOS transistor M2.

The overvoltage protective circuit 40 comprises two output nodes 40B and 40C, respectively electrically connected to the positive input node 36A and the ground node 36B of the power socket 36 through the power connection channels 41 and 43. The overvoltage protective circuit 40 further comprises a first resistor RI electrically connected between the input node 40B and the output node 40A, an overvoltage sensing circuit 50, and an npn-type transistor switch M3. The npn-type transistor switch M3 functions as a first switch having a collector, a base and an emitter, respectively electrically connected to the output node 40A, a node N1 of the overvoltage sensing circuit 50, and the output node 40C. The overvoltage sensing circuit 50 comprises a third resistor R3, a zener diode Z1 electrically connected between the third resistor R3 and the node N1, and a second resistor R2 electrically connected between the node N1 and the output node 40C.

When a voltage of the DC power provided by the DC power supply 44 is below the operating threshold voltage of the internal circuitry 34, the operation of the present invention input protection circuit 32 can be described as follows. Under normal situations, a voltage between the input nodes 40B and 40C cannot exceed a breakdown voltage of the zener diode Z1 of the overvoltage sensing circuit 50 ensuring that the zener diode Z1 is in a reverse bias and in the off state. The off state of the zener diode Z1 causes the second resistor R2 and the third resistor R3 to have no current passing through so that the voltages of the input node 40C and the node N1 are equivalent (a straddling voltage of the second resistor R2 is zero). Therefore, the voltage between the base and the emitter of the transistor switch M3 is zero thereby turning off the transistor switch M3. The transistor switch M3 is off and a straddling voltage of the first resistor R1 of the overvoltage protective circuit 40 is zero, meaning that the voltages of the output node 40A and the input node 40B are equivalent. The gate voltage of the MOS transistor M2 of the input protection circuit 32 will be electrically connected to the output node 40A, the first resistor R1 with a zero straddling voltage, input node 40B, the power connection channel 41, and the positive input node 36A of the power socket 36. The source of the MOS transistor M2 is electrically connected to the ground node 36B of the power socket 36 through the power connection channel 43 so that the MOS transistor M2 is turned on because the voltage between the gate and the source exceeds the threshold voltage of the MOS transistor M2. The MOS transistor M2 is able to control the base current of the BJT M1 to turn on the BJT M1 thereby inputting the DC power from the DC power supply 44 into the internal circuitry 34 through the emitter and the collector of the BJT M1.

The present invention input protection circuit 32 utilizes the MOS transistor M2 to control the BJT M1 thereby controlling functions of power transmission of the whole input protection circuit 32. A MOS transistor comprising a high input resistance of the gate is a voltage control-type component, and a leakage current of the gate of the MOS transistor is approximate to zero under DC operation. Although the overvoltage protective circuit 40 of the input protection circuit 32 for controlling the gate of the MOS transistor M2 does not consume power, the overvoltage protective circuit 40 can successfully control the MOS transistor M2. Furthermore, the zener diode Z1 and the transistor switch M3 of the overvoltage protective circuit 40 of the input protection circuit 32 are both not turned on so that the overvoltage protective circuit 40 cannot consume power.

The present invention input protection circuit 32 can prevent a reverse DC voltage and an overvoltage, which is a DC voltage exceeding the threshold voltage of the internal circuitry 34, from damaging the internal circuitry 34 of the handheld electric device 30. When the voltage of the DC power provided by the DC power supply 44 exceeds the threshold voltage (such as a user connects the handheld electric device 30 to the DC power supply 44 of nonconforming standards), the reverse bias of the zener diode Z1 of the overvoltage sensing circuit 50 exceeds the breakdown voltage, thereby turning on the zener diode Z1. After turning on the zener diode Z1, current will flow through the third resistor R3 and the second resistor R2. The current flowing through the second resistor R2 increases the straddling voltage between two nodes of the second resistor R2. The transistor switch M3, having the base and the emitter electrically connected to the both nodes of the second resistor R2, will then be turned on. After turning on the transistor switch M3 of the overvoltage protective circuit 40, current flows through the first resistor R1 and through the collector and the emitter of the transistor switch M3. The current flowing through the first resistor R1 increases the straddling voltage between the two nodes 40B and 40C of the first resistor R1. This causes the voltage of the output node 40A to decrease until it approaches the voltage of the input node 40C, due to the increase of the straddling voltage of the first resistor R1. Since the voltage of the output node 40A is approximately equal to the voltage of the input node 40C, the MOS transistor M2 having the gate and the source electrically connected to the two nodes 40A and 40C is turned off because the voltage between the gate and the source of the MOS transistor M2 is less than the threshold voltage. The MOS transistor M2, controlling current of the base of the BJT M1, is turned off so that the BJT M1 is turned off. The DC power supply 44, having voltage exceeding the threshold voltage, cannot transmit DC power through the emitter and the collector of the BJT M1 into the internal circuitry 34 for protecting the internal circuitry 34.

Figure 3:
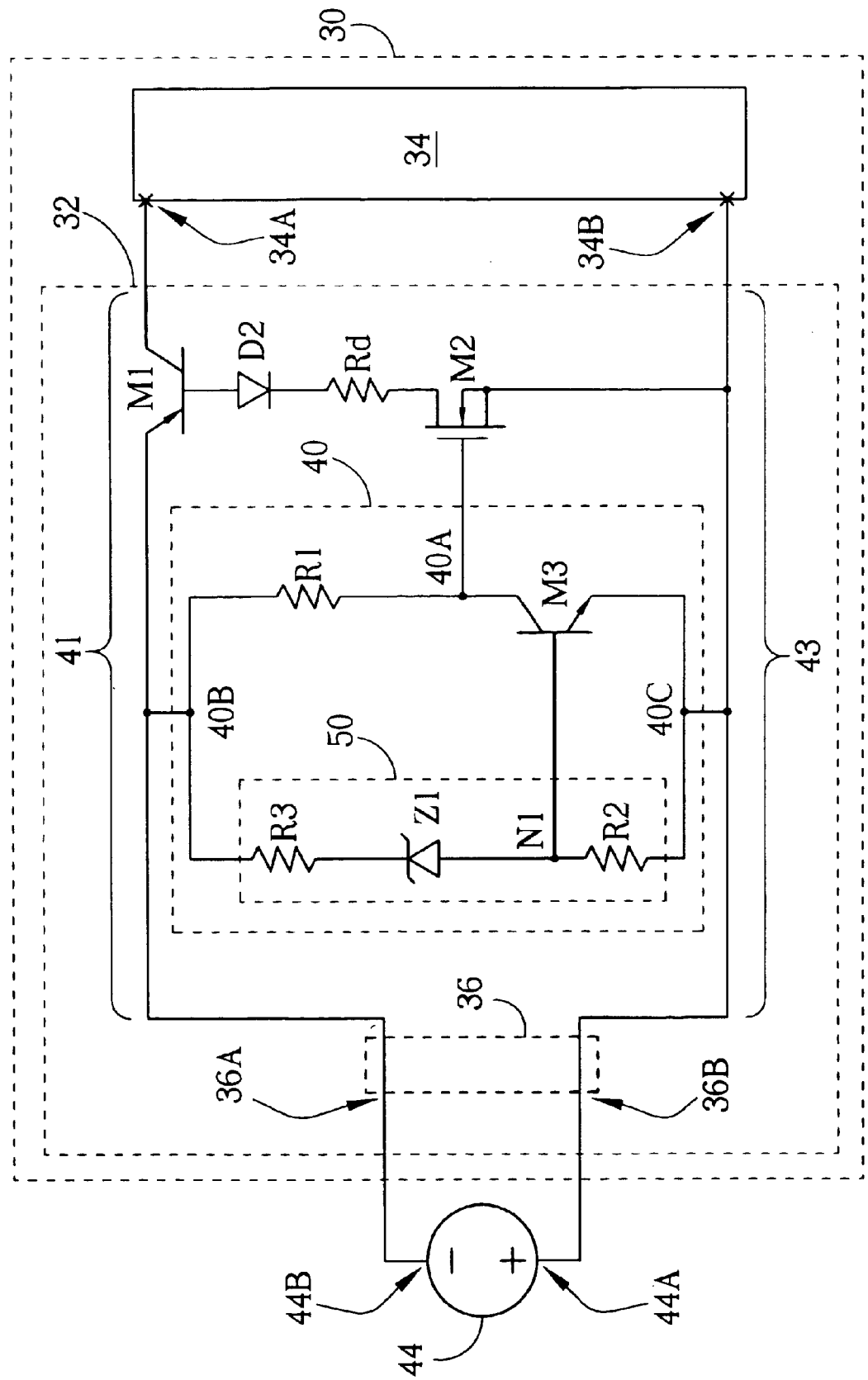
FIG. 3 is a diagram of an input protection circuit applied in a handheld electric device depicted in FIG. 2 with a reverse direction electrically connected to the DC power supply.

Please refer to FIG. 3. FIG. 3 is a diagram of an input protection circuit 32 applied in a handheld electric device depicted in FIG. 2 with a reverse direction electrically connected to the DC power supply 44. When the handheld electric device electrically connects with an inverse DC voltage, the operation of the present invention input protection circuit 32 can be described as follows. When the two input nodes 40C and 40B are electrically connected to the output node 44A and 44B of the DC power supply 44, a forward bias causes the zener diode Z1 to be turned on, and the current also flows from the input node 40C to the node N1 through the second resistor R2. When the straddling voltage between the two nodes of the resistor R2 increases, the voltage of the input node 40C is larger than the voltage of the node N1 so that the base and the emitter of the transistor switch M3, functioning as the first switch, are inversed to turn off the transistor switch M3. The off state of the transistor switch M3 causes no current to flow through the first resistor R1 so that the voltage of the output node 40A is equal to the voltage of the input node 40B. The gate of the MOS transistor M2 electrically connects to the output node 44B of the DC power supply 44 through the output node 40A because the first resistor R1 has no straddling voltage. The MOS transistor M2 electrically connects to the output node 44A of the DC power supply 44 through the power connection channel 43. Above-mentioned situations cause the MOS transistor M2 to have an inverse bias between the gate and the source so as to turn off the MOS transistor M2. Since the MOS transistor M2 controlling the base current of the BJT M1 is off, the BJT will be turned off to prevent the inverse DC power from inputting so as to protect the internal circuitry 34 from being damaged by the inverse DC voltage. Furthermore, the diode D2 electrically connected between the high-resistance resistor Rd and the BJT M1 can prevent a reverse parasitic current flowing from the source to the drain of the MOS transistor M2 from flowing into the base of the BJT M1 so as to protect the BJT M1.

Generally, the present invention input protection circuit 32 utilizes the MOS transistor M2 to control the BJT M1 connected within the power connection channel 41, and the overvoltage protective circuit 40 controls the MOS transistor M2. The overvoltage sensing circuit 50 of the overvoltage protective circuit 40 senses the voltage straddling between the positive input node 36A and the ground node 36B. Under normal situations, the overvoltage sensing circuit 50 will turn off the transistor switch M3 of the overvoltage protective circuit 40 to output positive voltage from the output node 40A of the overvoltage protective circuit 40. This turns on the MOS transistor M2 and the BJT Ml so as to transmit the DC power from the DC power supply 44 into the internal circuitry 34 through the BJT M1. If the positive DC voltage provided by the DC power supply 44 is over a specific value, the overvoltage sensing circuit 50 will turn on the transistor switch M3, and correspondingly turn off the MOS transistor M2 and the BJT M1. This prevents the DC power exceeding the threshold value of the DC power supply 44 from transmitting to the internal circuitry 34, thus protecting the internal circuitry 34. If the DC power supply 44 inversely connects to the handheld electric device 30, the overvoltage sensing circuit 50 will turn off the transistor switch M3, and correspondingly turn off the MOS transistor M2 and the BJT M1 to prevent the internal circuitry 34 from being damaged by the inverse DC voltage. Additionally, the high-resistance resistor Rd connected between the diode D2 and the MOS transistor M2 functions as a negative feedback mechanism. If the current between the emitter and the collector of the BJT 41 exceeds a specific value, the base current flowing from the BJT 41 to the high-resistance resistor Rd will be increased. Then, the straddling voltage of the high-resistance resistor Rd will be increased to oppress the straddling voltage of the diode D2 and MOS transistor M2. This decreases the current of the diode D2 and MOS transistor M2, and further decreases the current between the emitter and the collector of the BJT M1 so as to protect the internal circuitry 34 and prevent the BJT from being damaged by an overcurrent. In the preferred embodiment, the diode D2 is a Schottky diode. Under normal situations, the straddling voltage of the Schottky diode in the on state is small so as to keep the voltage between the emitter and the base of the BJT M1 in a certain level, which drives the current flowing from the emitter to the collector of the BJT M1.

In contrast to the prior art, the present invention input protection circuit 32 utilizes the MOS transistor M2 to control the BJT M1 connected within the power connection channel 41. Therefore, the volume of the input protection circuit 32 is reduced, and effectively prevents the positive DC voltage exceeding the threshold voltage and prevents the inverse voltage from damaging the internal circuitry of the handheld electric device.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An input protection circuit of a handheld electric device for protecting internal circuitry of the handheld electric device, the internal circuitry having a positive input node and a ground node, the input protection circuit comprising:

a power socket having a positive input node and a ground node for electrically connecting two output nodes of a direct current (DC) power supply, the ground node of the power socket being electrically connected to the ground node of the internal circuitry;

a bipolar junction transistor (BJT) having an emitter electrically connected to the positive input node of the power socket, a collector electrically connected to the positive input node of the internal circuitry, and a base;

a metal-oxide semiconductor (MOS) transistor for controlling on and off of the BJT, the MOS transistor having a source electrically connected to the ground node of the internal circuitry, a drain electrically connected to the base of the BJT, and a gate;

a first resistor electrically connected between the positive input node of the power socket and the gate of the MOS transistor;

a first switch electrically connected between the gate of the MOS transistor and the ground node of the power socket; and an overvoltage sensing circuit electrically connected between the positive input node and the ground node of the power socket for controlling the first switch;

wherein when the DC voltage exceeding the threshold inputs from the positive input node and the ground node of the power socket, the overvoltage sensing circuit will turn on the first switch to directly connect the gate of the MOS transistor with the ground node of the power socket so as to turn off the MOS transistor; and when the DC voltage below the threshold inputs from the positive input node and the ground node of the power socket, the overvoltage sensing circuit will turn off the first switch so as approximate a voltage at the gate of the MOS transistor to a voltage at the positive input node of the power socket thereby turning on the MOS transistor.

2. The input protection circuit of claim 1 further comprising a diode electrically connected between the base of the BJT and the drain of the MOS transistor, wherein when the reverse DC voltage inputs from the positive input node and the ground node of the power socket, the diode will prevent a reverse parasitic current of the MOS transistor from flowing into the base of the BJT so as to protect the BJT.

3. The input protection circuit of claim 1 further comprising a high-resistance resistor electrically connected between the base of the BJT and the drain of the MOS transistor, wherein when the DC voltage below the threshold inputs from the positive input node and the ground node of the power socket, the resistor will greatly reduce a current flowing through the base of the BJT to the drain of the MOS transistor.

4. The input protection circuit of claim 1 wherein the first switch is a transistor switch, the overvoltage sensing circuit comprising:

a zener diode electrically between the positive input node of the power socket and a base of the transistor switch; and a second resistor electrically connected between the base of the transistor switch and the ground node of the power socket;

wherein when the DC voltage exceeding the threshold inputs from the positive input node and the ground node of the power socket, the zener diode is turned on to increase a voltage at the base of the transistor switch so as to turn on the transistor switch; and when the DC voltage below the threshold inputs from the positive input node and the ground node of the power socket, the zener diode is turned off to approximate the voltage at the base of the transistor switch to a voltage at the ground node of the power socket so as to turn off the transistor switch.

* * * * *